UNITED STATES PATENT OFFICE.

CHRISTOPH. AUGUST BAUMANN, OF NEW YORK, N. Y.

IMPROVEMENT IN COVERING FOR STEAM-BOILERS.

Specification forming part of Letters Patent No. 100,354, dated March 1, 1870.

*To all whom it may concern:*

Be it known that I, CHRISTOPH. AUGUST BAUMANN, of the city, county, and State of New York, have invented a new and improved felting or composition for the covering or coating of steam boilers and pipes or other devices for generating steam or heated air, thereby preventing the radiation of heat and condensation of steam, and greatly economizing the use of fuel, of which the following is a specification:

The nature of my invention consists in the combination of the following-named ingredients: coal-dust, asbestus, lime-putty, soap-stone, calcined plaster, ashes, and paper-pulp, so as to produce an adhesive composition that will expand or contract in proportion to the expansion or contraction of the surface on which it is placed or surrounds.

To enable others to make and use my invention, I will proceed to describe the method of manufacturing it.

To prepare the felting or composition for the first coating of steam-boilers or other heated surfaces I mix one (1) part of coal-dust, three (3) parts of crushed or ground asbestus, one (1) part of calcined plaster, one (1) part of ashes, and two (2) parts of lime-putty, made from limestone or oyster-shells; and for the second or outer coating I mix five (5) parts of ordinary paper-pulp, same as used for paper-making; two parts of lime-putty, as above described; one (1) part of pulverized soap-stone; one (1) part of coal-dust; one (1) part of ashes, and one (1) part of calcined plaster, the whole to be well mixed with water to about the consistency of mortar for ordinary plastering, when it is ready for use.

What I claim as my invention, and desire to secure by Letters Patent, is—

1. An improved felting or composition for coating the exterior of steam-boilers, pipes, or other heated surfaces, formed of asbestus, coal-dust, lime-putty, ashes, and calcined plaster, or their equivalents, combined with each other in the proportions and in the manner hereinbefore specified and described.

2. An improved felting or composition for coating the exterior of steam boilers, pipes, or other heated surfaces, to be used as an outer coating or finish, formed of paper-pulp, lime-putty, ashes, soap-stone, coal-dust, and calcined plaster, or their equivalents, combined with each other in the proportions and in the manner hereinbefore specified and described.

In testimony that I claim the above I have hereunto subscribed my name in the presence of two witnesses.

CHRISTOPH. AUGUST BAUMANN.

Witnesses:
BENJ. F. PENNIMAN,
JONATHAN MARSHALL.